United States Patent [19]

Wachs et al.

[11] Patent Number: 4,490,909

[45] Date of Patent: Jan. 1, 1985

[54] TRAVELLING PIPE CUTTER

[75] Inventors: Edward H. Wachs, Lake Forest; Horst Kwech, Lake Bluff, both of Ill.

[73] Assignee: The E. H. Wachs Company, Wheeling, Ill.

[21] Appl. No.: 444,679

[22] Filed: Nov. 26, 1982

[51] Int. Cl.³ .............................................. B26B 27/00
[52] U.S. Cl. ......................................... 30/97; 30/101; 266/56
[58] Field of Search ...................... 30/94–97, 30/99–101, 341; 266/56, 69

[56] References Cited

U.S. PATENT DOCUMENTS

| 2,291,395 | 7/1942 | Levey | 29/69 |
|---|---|---|---|
| 2,842,238 | 7/1958 | Shaw et al. | 30/97 X |
| 3,168,002 | 2/1965 | Walling | 30/97 X |
| 3,730,239 | 5/1973 | Kaman et al. | 30/341 |
| 3,840,170 | 10/1974 | Arikawa | 266/56 X |

FOREIGN PATENT DOCUMENTS

| 62714 | 5/1981 | Japan | 30/101 |
|---|---|---|---|
| 831098 | 3/1960 | United Kingdom | 30/97 |

OTHER PUBLICATIONS

WACHS Model E TRAV-L-CUTTER Operating Manual and Replacement Parts List.

*Primary Examiner*—James M. Meister
*Assistant Examiner*—Douglas D. Watts
*Attorney, Agent, or Firm*—Wood, Dalton, Phillips, Mason & Rowe

[57] ABSTRACT

A travelling pipe cutter for cutting of pipe having a frame defined by a pair of spaced, interconnected plates with guide rollers thereon for movably supporting said frame for travel around a pipe, a gear box positioned between said frame plates and having a feed drive shaft extending from opposite sides thereof and through said adjacent frame plates, chain means extended around the pipe and drivingly connected to drive sprockets at opposite ends of said feed drive shaft, a cutter drive shaft extending from the gear box and through a curved slot in one frame plate and in spaced parallel relation with the feed drive shaft, the gear box being rotatable about the axis of the feed drive shaft relative to the frame to adjust the distance of the cutter drive shaft from the pipe, drive mechanism for rotating the drive shafts including motors mounted for movement with the gear box and gearing in the gear box which interconnects the motors to the drive shafts, and an adjustable connection between the frame and the gear box for adjusting the relative position therebetween.

3 Claims, 6 Drawing Figures

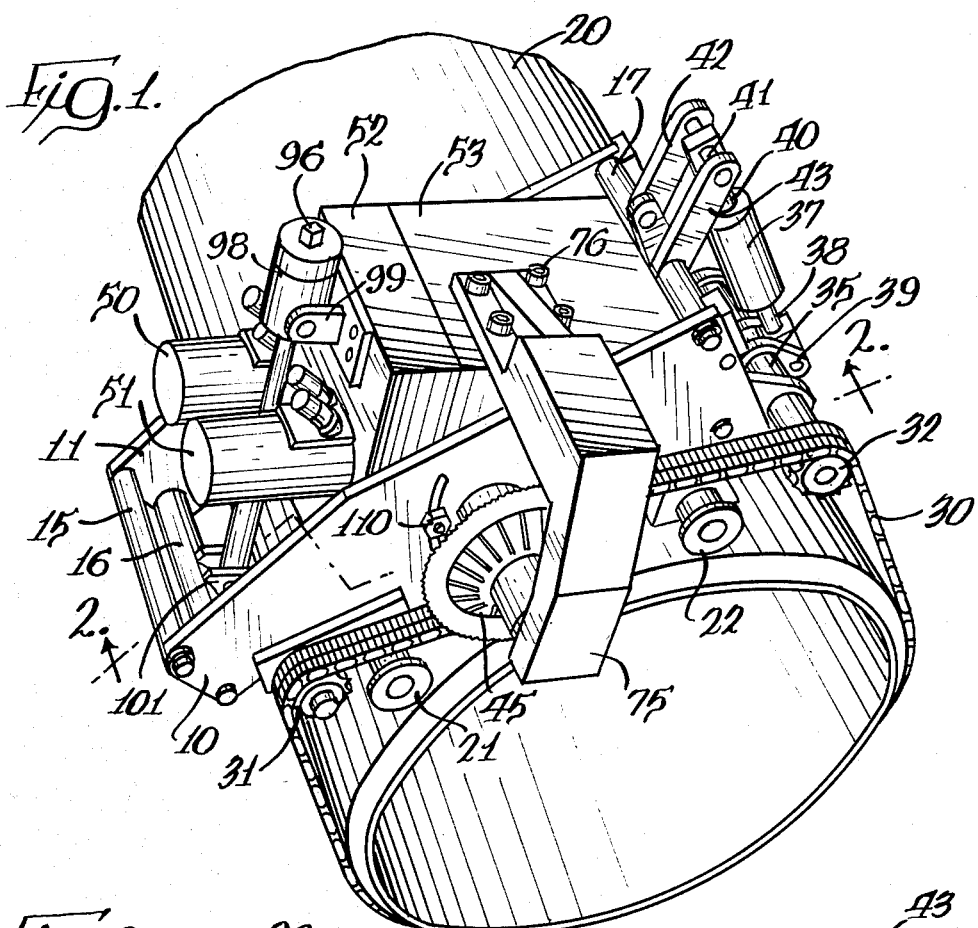
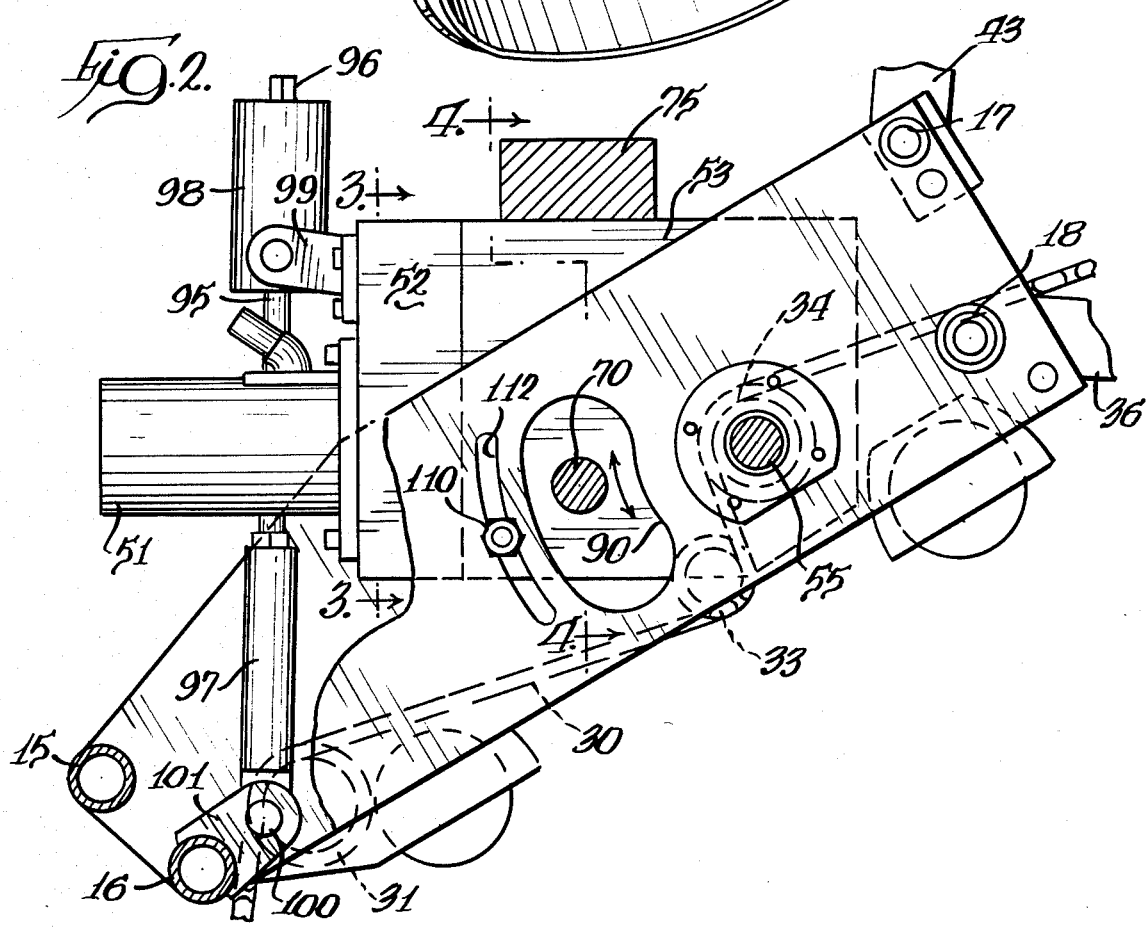

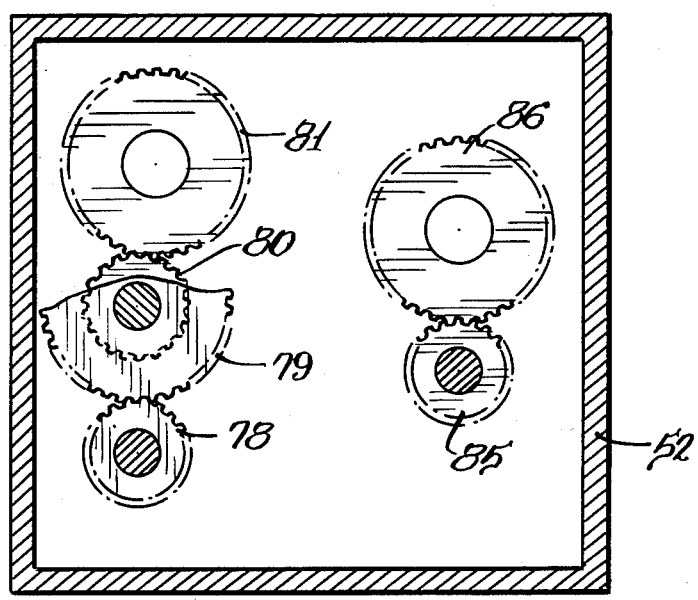
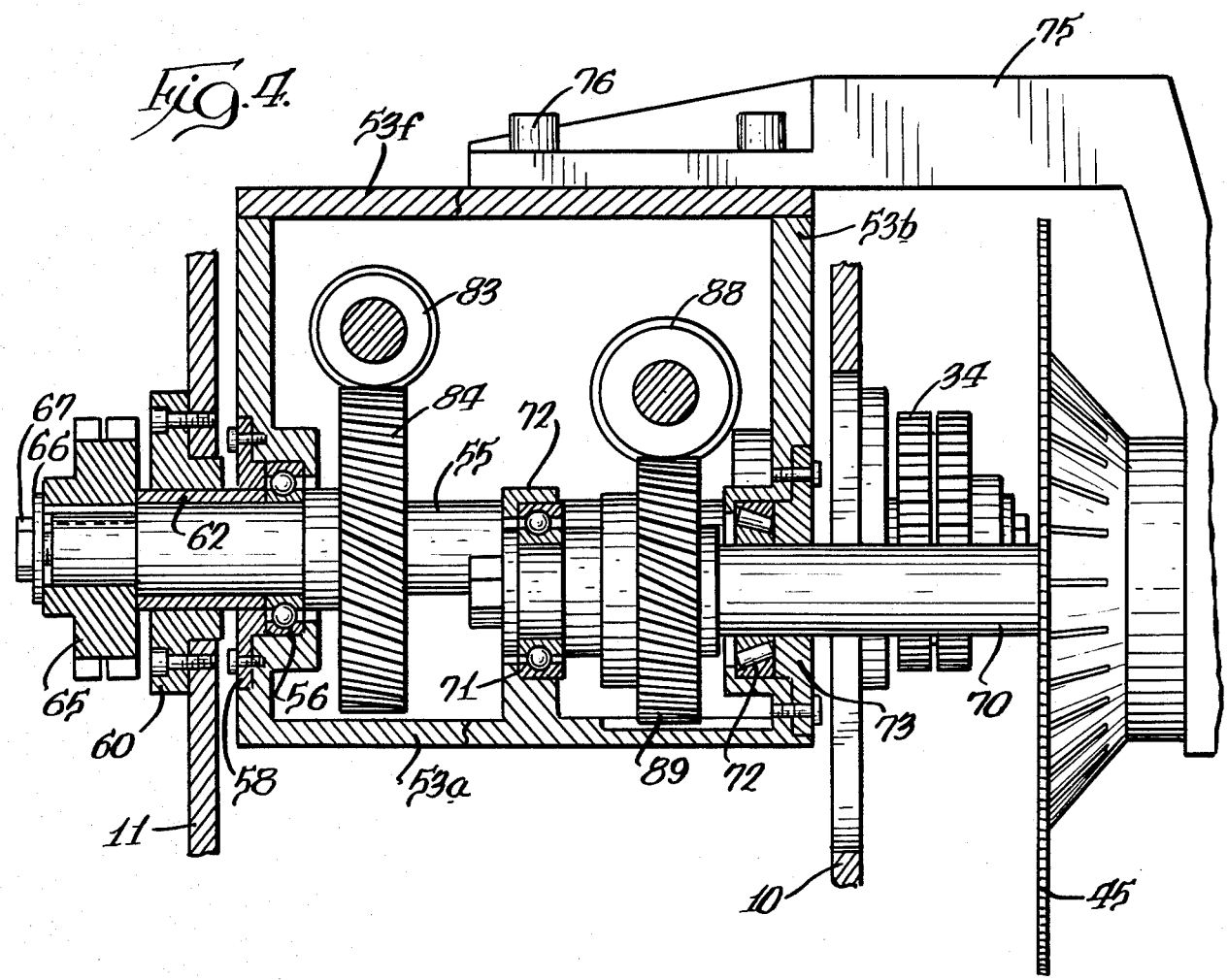

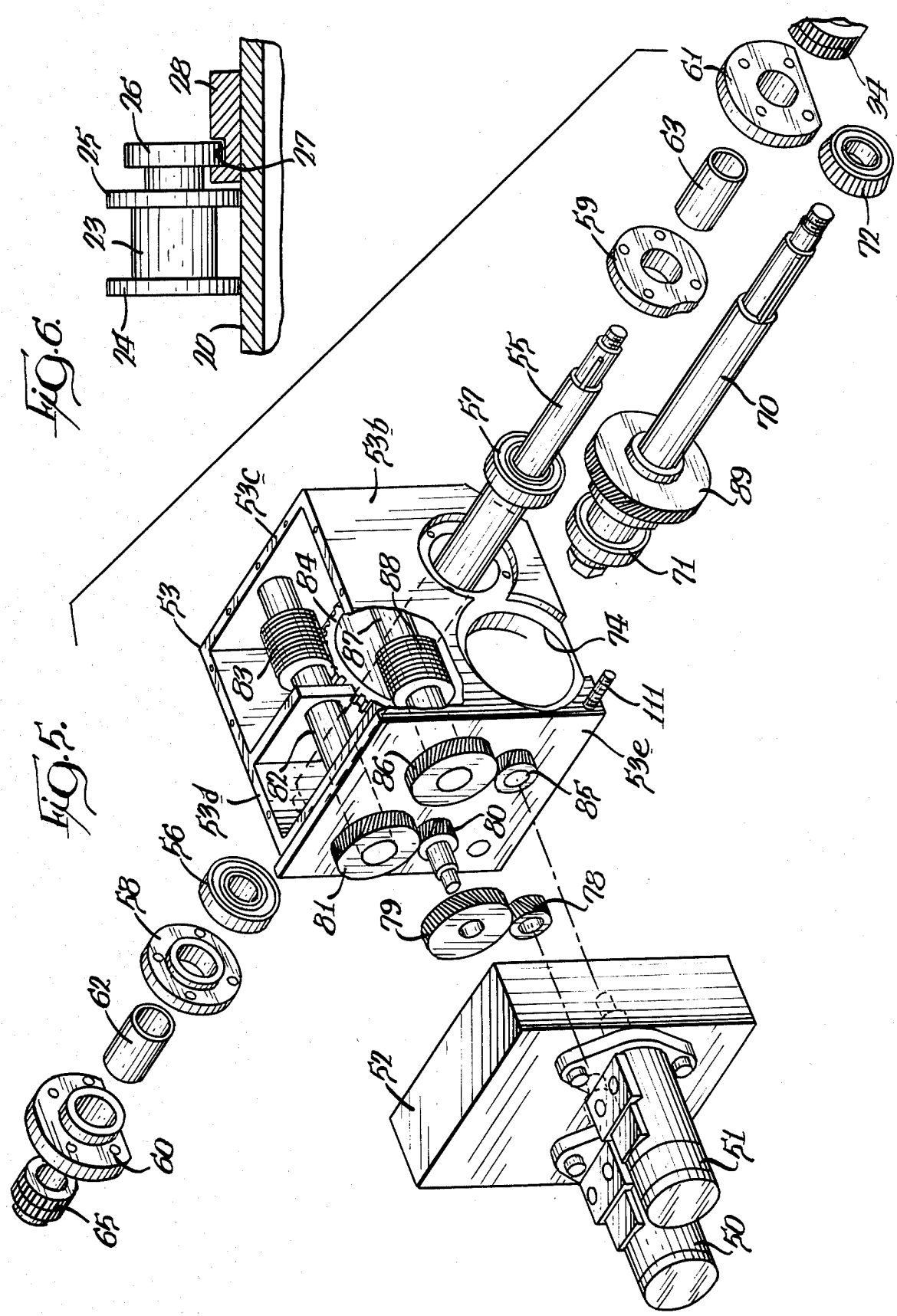

TRAVELLING PIPE CUTTER

BACKGROUND OF THE INVENTION

This invention pertains to a travelling pipe cutter particularly suitable for cutting heavy wall pipe and which utilizes an integrated gear box for drive of the machine around the pipe and for drive of the cutting tool and with the depth-of-cut being easily adjusted by positioning of the integrated gear box relative to a supporting frame having means for guiding the machine around the pipe.

A travelling pipe cutter which carries a slitting saw around a pipe is well known in the art. The Levey U.S. Pat. No. 2,291,395 shows such a device wherein a frame is held to a pipe by a pair of chains and a motor, carried on a frame, drives a feed drive shaft having sprockets engageable with the chain and a cutter drive shaft. In the structure of the Levey patent, the cutter drive shaft can be adjusted relative to the frame to vary the depth of the cutter. However, this results in relative movement between the feed drive shaft and the cutter drive shaft whereby a complicated drive train is required to interconnect the two drive shafts while permitting movement of one relative to the other.

Applicant's assignee manufactures a travelling pipe cutter having a pair of motors, with one motor driving the cutter drive shaft and the other motor driving the feed drive shaft for advancing the unit along a pipe. The adjustment of the cutter drive shaft to position the cutter relative to the pipe can be accomplished without any complicated drive train between the two drive shafts. However, the cutter drive shaft is mounted within its own housing which has complex mounting structure for adjustment of the cutting tool depth.

SUMMARY OF THE INVENTION

One primary feature of the invention disclosed herein is to provide a travelling pipe cutter capable of heavy-duty operation for cutting of heavy wall pipe wherein the frame of the machine is guided in its travel around the pipe and the gearing for the cutter drive shaft and the feed drive shaft is integrated into a main gear box which can be sealed and have oil for cooling and lubrication.

An additional feature is the mounting of the gear box whereby it can be pivoted about the axis of the drive shaft for adjusting the distance of the cutter drive shaft from the pipe.

More particularly, the travelling pipe cutter has a frame defined by a pair of spaced-apart interconnected plates with guide rollers extending therefrom and engageable with the pipe for guiding of the machine around the pipe. The main gear box is positioned between the frame plates and has the feed drive shaft extending from opposite sides thereof and through openings in the adjacent side plates with means rotatably mounting the feed drive shaft in the frame plates. The cutter drive shaft extends from one side of the gear box in spaced parallel relation with one end of the feed drive shaft and through a curved opening in the frame side plate and means interconnects the main gear box and the frame for rotatable adjustment of the main gear box about the feed drive shaft to adjust the position of the cutter drive shaft relative to the frame and the pipe.

An object of the invention is to provide a travelling pipe cutter for cutting of pipe comprising, a frame, means on said frame for movably supporting said frame for travel around a pipe, a main gear box associated with said frame, a feed drive shaft extending from said main gear box, a cutter drive shaft extending from the main gear box in parallel relation with the feed drive shaft, drive means for said drive shafts including at least one motor and interconnecting gearing, means mounting the main gear box for rotation about the feed drive shaft to adjust the main gear box relative to the frame and the distance between the cutter drive shaft and the pipe, and means for locking the main gear box to the frame in adjusted position.

BRIEF DESCRIPTION OF THE DRAWINGS

FIG. 1 is a perspective view of the travelling pipe cutter, shown in association with a pipe;

FIG. 2 is a vertical section, on an enlarged scale, taken generally along the line 2—2 in FIG. 1;

FIG. 3 is a fragmentary vertical section, taken generally along the line 3—3 in FIG. 2 with parts broken away and on an enlarged scale;

FIG. 4 is a fragmentary vertical section, taken generally along the line 4—4 in FIG. 2 and on an enlarged scale;

FIG. 5 is a perspective exploded view of the change gear box and main gear box and parts associated therewith; and FIG. 6 is a fragmentary detail view showing the association between a guide roller and the cam fixed to a pipe.

DESCRIPTION OF THE PREFERRED EMBODIMENT

The travelling pipe cutter is shown generally in FIG. 1 and has a frame with a pair of spaced-apart side plates 10 and 11. These plates are rigidly interconnected by tubular members extending therebetween including tubular members 15 and 16 at the rear of the machine and a pair of tubular members 17 and 18 at the front of the machine. These tubular members are welded at their ends to the side plates to make a rigid structure.

The machine is supported on the pipe 20 for movement about the circumference of the pipe by a plurality of guide rollers extending outwardly from each of the side plates. The guide rollers 21 and 22 extend outwardly from the frame side plate 10 and a corresponding pair of guide rollers extend outwardly from the side plate 11. A fragmentary view of one of the latter guide rollers is identified at 23, as shown in FIG. 6, wherein flanges or lands 24 and 25 ride on the outer surface of the pipe 20. Additionally, there is a reduced diameter follower section 26 engaged in a groove 27 of a circular cam 28 which is attached to the pipe and extends around the circumference thereof whereby the machine follows an accurate path about the pipe, as determined by the cam track 28. Although not shown, it will be readily apparent that the cam track can come in two sections and be fitted around the pipe and, thereafter, the two sections interconnected to form a continuous cam track around the pipe.

The machine is caused to travel around the pipe by drive means carried on the frame coacting with chain means extending around the pipe. The chain means includes a pair of chains located at opposite sides of the frame with one of the chains being shown at 30 and there being a similar chain at the opposite side of the machine. The chain 30 extends around the pipe and around a series of idler sprockets 31, 32 and 33 as well as a drive sprocket 34, shown in FIG. 4. These idler sprockets and the drive sprocket are duplicated at the rear of the machine, outboard of the frame side plate 11. The tension on the chains can be adjusted through mechanism at the front of the machine. This mechanism includes idler sprockets 32 which are rotatably mounted on a tubular member 35 which, by means of a pair of arms, one of which is shown at 36 rotatable on the connecting tubular member 18 can be moved to adjust the tension on the chain and hold the chains and machine firmly against the pipe. This adjustment is made by a turnbuckle-type structure including a rotatable member 37 which can be moved along a threaded member 38 pivotally connected to brackets 39 fixed to the tubular member 35 and which, at its upper end, has a rod 40 pivotally connected by a pin 41 to a pair of arms 42 and 43 extending upwardly from the tubular member 17 and with the arms having their lower ends welded to the tubular member. Although a single turnbuckle unit is shown, it may be preferred in order to exert sufficient tensioning force to utilize two turnbuckle units. The structure shown is shifted closer to one of the side plates of the frame and the structure duplicated in order to provide two turnbuckle units.

In the travel of the machine about the pipe, a cut is made through the pipe wall by a metal-cutting slitting saw 45.

The drive for the feeding of the machine about the pipe and rotation of the slitting saw 45 is derived from a pair of fluid motors 50 and 51 mounted to a change gear box 52 connected to a main gear box 53. The main gear box has a bottom 53a and four side walls 53b, 53c, 53d and 53e. A removable cover 53f seals the main gear box. These motors can be hydraulic motors, with each motor connected into a hydraulic circuit, with suitable valving to control the flow of oil to the motor, with the rate of delivery of oil controlling the speed of the motors and through gearing within the gear boxes determining the speed of the drive shafts.

Referring particularly to FIGS. 3, 4 and 5, a feed drive shaft 35 is rotatably mounted within the main gear box by bearings 56 and 57 positioned within shaped openings in opposite walls 53b and 53d of the gear box and held in position by respective cover plates 58 and 59 which are positioned in recessed openings in the spaced-apart side walls of the main gear box and attached thereto in sealed relation by threaded members. Opposite ends of the feed drive shaft 55 also extend outwardly through openings in the frame side plates 10 and 11, with these openings receiving reduced diameter portions of cylindrical attaching plates 60 and 61 which are secured to the side plates by threaded members. A pair of bushings 62 and 63 surround reduced diameter portions of the feed drive shaft 55 and are positioned within openings in the attaching plates 60 and 61 to facilitate rotation of the gear boxes relative to the frame for a purpose to be described. The ends of the drive shaft 55 mount the drive sprocket 34, previously referred to, at one end and a second drive sprocket 65, at the other end. The drive sprockets are keyed to the ends of the drive shaft and retained thereon in a conventional manner, as by a washer 66 and a nut 67 threaded on a threaded end of the drive shaft.

A cutter drive shaft 70 extends from one side of the main gear box in spaced, parallel relation to one end of the feed drive shaft 55. The cutter drive shaft 70 has an inner end rotatably mounted in a thrust bearing 71 supported in an integral part 72 of the main gear box and an intermediate part thereof supported by a thrust bearing 72 positioned within a cover plate 73 fitted within an opening 74 of the main gear box wall and secured thereto in sealed relation by threaded members. The slitting saw 45 is keyed to an outer end of the drive shaft and secured thereto in a suitable manner. As seen in FIG. 1, the outboard end of the cutter drive shaft 70 can be supported by an outrigger arm 75 which is secured to the top of the main gear box 53 by threaded members 76.

The drive of the feed drive shaft 55 is from the motor 50 which has its output shaft connected to change speed gearing in the change gear box and, particularly, to a gear 78 which meshes with the gear 79 mounted on a shaft having a gear 80 which meshes with a gear 81 fixed to a rotatable shaft 82 rotatably mounted within the gear box. A worm 83 on the shaft 82 meshes with a worm wheel 84 fastened to the feed drive shaft 55. The drive of the cutter drive shaft is from the motor 51 which has its output shaft connected to a gear 85 which meshes with a gear 86 on a rotatable shaft 87 which has a worm 88 meshing with a worm wheel 89 on the cutter drive shaft 70.

In use of the travelling pipe cutter, the machine is mounted on the pipe in association with a cam track 28 and the chain means, with the proper tension being applied to the chains, and with the slitting saw 45 out of engagement with the pipe. It is necessary to then advance the slitting saw to cutting depth to cut through the wall of the pipe. In the travelling pipe cutter disclosed herein, this is readily accomplished by rotation of the gear boxes about the axis of the feed drive shaft 55, with the result that rotational adjustment of the gear boxes correspondingly adjusts the distance of the cutter drive shaft 70 to the pipe and, therefore, the depth of the slitting saw.

As seen in FIGS. 2 and 4, the cutter drive shaft 70 extends through the frame side plate 10 and, more particularly, through an elongate arcuate opening 90 which has a curvature with the axis of the feed drive shaft 55 at the center of curvature. The enables movement of the cutter drive shaft relative to the frame plate 10 whereby the cutter can be advanced into the pipe wall. This movement is accomplished by rotation of a shaft 95 having an upper end 96 shaped for tool engagement and which has a threaded lower end which threads into a tubular member 97. The shaft 95 is mounted within a cylindrical member 98 housing thrust washers and which is pivoted to a pair of ears, one of which is shown at 99 and which extend from the rear of the change gear box 52. Tubular member 97 is pivotally connected at its lower end by a pivot pin 100 to a pair of ears, one of which is shown at 101 welded to the tubular frame interconnecting member 16. The slitting saw 45 is advanced into the pipe wall by rotating the shaft 95 to, in effect, extend the length of the connection between the ears 99 and 101. When the final cutting depth is achieved, additional locking of the gear box in adjusted position can be obtained by tightening a nut 110 onto a threaded member 111 extending from the gear box wall and which extends through an arcuate opening 112 in the frame side plate 10 and having the same curvature as the elongate slot 90. A similar locking structure is positioned at the opposite side of the machine, with there being a curved slot in the frame side plate 11.

With the structure disclosed herein, a heavy-duty, travelling pipe cutter is provided having all the gearing located in a change gear box and a main gear box, with the primary gearing for both the feed drive shaft and the cutter drive shaft being integrated into the main gear box which can be sealed and have oil therein for cooling and lubrication. The drive train for both drive shafts can be optimized without complexities required, as in the prior art, to enable adjustment of the cutter drive shaft relative to the pipe.

As the gear boxes are adjusted relative to the frame, arcuate movement imparted to the worm causes a slight rotation of the worm wheel 84 which results in small movement of the machine along the pipe.

We claim:

1. A travelling pipe cutter for cutting a pipe while travelling around the pipe, means for guiding the cutter including a cam track, said cutter comprising a frame having a pair of spaced-apart interconnected plates and having guide rollers at both sides thereof engageable with the pipe and with the guide rollers at one side additionally engageable with the cam track, chain means extendable around the pipe, a main gear box positioned between said frame plates, a feed drive shaft extending outwardly from both sides of the main gear box and through the adjacent frame side plate with chain drive sprockets on the ends thereof, bushings in said side plates surrounding said feed drive shaft whereby the main gear box can rotate about the feed drive shaft, a cutter drive shaft extending from one side of the main gear box in spaced parallel relation with the feed drive shaft, an arcuate slot in one side plate having a curvature with the feed drive shaft as the center of curvature through which the cutter drive shaft with a cutter blade on the end thereof extends, means connected between the frame and main gear box for rotatably adjusting the main gear box relative to the frame, a change gear box connected to the main gear box, a pair of motors mounted on said change gear box, and gearing in said gear boxes for connecting said motors one to the feed drive shaft and the other to said cutter drive shaft said feed drive shaft rotating said sprockets thereby moving said pipe cutter along said chain and around said pipe.

2. A travelling pipe cutter for cutting a pipe while travelling around the pipe, said cutter comprising a frame having a pair of spaced-apart interconnected frame plates and having guide rollers at both sides thereof engageable with the pipe, chain means extendable around the pipe, a pivotally mounted main gear box positioned between said frame plates, a feed drive shaft extending outwardly from both sides of the main gear box and through the adjacent frame side plate with chain drive sprockets on the ends thereof, a cutter drive shaft, extending from one side of the main gear box in spaced parallel relation with the feed drive shaft and extending beyond one frame side plate with a cutter blade on the end thereof, a change gear box connected to the main gear box, a pair of motors mounted on said change gear box each having an output shaft, change speed gearing in said change gear box connected to the output shafts of the motors and a pair of shafts extending into the main gear box, and gearing in the main gear box interconnecting said pair of shafts one to the feed drive shaft and the other to said cutter drive shaft, and means sealing said main gear box including the cutter drive shaft and the feed drive shaft relative thereto whereby oil can be held in the main gear box for cooling and lubrication said cutter further including a first elongate curved slot in one of said frame plates through which said cutter drive shaft extends, and locking means comprising an elongated coupling member extending from said main gear box, and a second elongate curved slot in said one frame plate parallel to said first elongated curved slot through which said coupling member extends and a connecting means on said coupling member for releasably engaging against said one frame plate to hold said gear boxes in a fixed position, said feed drive shaft rotating said sprockets thereby moving said pipe cutter along said chain and around said pipe.

3. A travelling pipe cutter as defined in claim 2 including means mounting said gear boxes for rotation about the axis of the feed drive shaft to adjust the distance of the cutter drive shaft relative to the pipe.

* * * * *